US010481600B2

United States Patent
Yen et al.

(10) Patent No.: US 10,481,600 B2
(45) Date of Patent: Nov. 19, 2019

(54) SYSTEMS AND METHODS FOR COLLABORATION BETWEEN AUTONOMOUS VEHICLES

(71) Applicant: GM GLOBAL TECHNOLOGY OPERATIONS LLC, Detroit, MI (US)

(72) Inventors: Chih-hung Yen, Bloomfield Hills, MI (US); Yao Hu, Sterling Heights, MI (US); Yilu Zhang, Northville, MI (US); Paul E. Krajewski, Troy, MI (US); Steven W. Holland, Saint Clair, MI (US); Mutasim A. Salman, Madison, WI (US); Xiaoyu Huang, Troy, MI (US); Azeem Sarwar, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 89 days.

(21) Appl. No.: 15/705,394

(22) Filed: Sep. 15, 2017

(65) Prior Publication Data
US 2019/0086914 A1 Mar. 21, 2019

(51) Int. Cl.
*G05D 1/00* (2006.01)
*G05D 1/02* (2006.01)
*H04L 29/08* (2006.01)

(52) U.S. Cl.
CPC ......... *G05D 1/0022* (2013.01); *G05D 1/0027* (2013.01); *G05D 1/0212* (2013.01); *G05D 1/0295* (2013.01); *G05D 1/0297* (2013.01); *H04L 67/1046* (2013.01); *H04L 67/1051* (2013.01); *H04L 67/12* (2013.01)

(58) Field of Classification Search
CPC .. G05D 1/0022; G05D 1/0027; G05D 1/0212; G05D 1/0295; G05D 1/0297; H04L 67/1046; H04L 67/1051; H04L 67/12
See application file for complete search history.

(56) References Cited

U.S. PATENT DOCUMENTS

| 6,356,820 B1 * | 3/2002 | Hashimoto | G08G 1/22 180/167 |
| 7,765,038 B2 * | 7/2010 | Appleby | F41H 13/00 180/167 |
| 8,311,730 B2 * | 11/2012 | Neff | B60W 40/02 701/1 |

(Continued)

*Primary Examiner* — Behrang Badii
*Assistant Examiner* — Daniel L Greene
(74) *Attorney, Agent, or Firm* — Lorenz & Kopf, LLP

(57) ABSTRACT

Systems and method are provided for collaboration between autonomous vehicles. In one embodiment, a processor-implemented method for coordinating travel between multiple autonomous vehicles is provided. The method includes sending a collaboration request to one or more vehicles in an area to form a group to perform a mission, receiving an acceptance of the collaboration request to join the group wherein the group includes a plurality of vehicles, cooperating in assigning leading functions for the group to one or more of the plurality of vehicles in the group, cooperating in mission negotiations for the group, cooperating in determining a formation for the group, and cooperating in generating a trajectory for the group. The vehicles in the group are operated in accordance with the determined formation and generated trajectory.

20 Claims, 14 Drawing Sheets

(56) References Cited

U.S. PATENT DOCUMENTS

| | | | | |
|---|---|---|---|---|
| 8,787,246 | B2* | 7/2014 | Brownrigg | H04B 7/18584 |
| | | | | 370/316 |
| 8,930,059 | B2* | 1/2015 | Neff | G05D 1/0231 |
| | | | | 701/23 |
| 9,494,935 | B2* | 11/2016 | Okumura | B60W 30/00 |
| 9,555,885 | B2* | 1/2017 | Stanek | B60R 16/02 |
| 9,710,836 | B1* | 7/2017 | O'Malley | G06Q 30/0607 |
| 9,805,605 | B2* | 10/2017 | Ramanujam | G08G 1/202 |
| 2007/0112700 | A1* | 5/2007 | Den Haan | G05D 1/024 |
| | | | | 706/14 |
| 2008/0056164 | A1* | 3/2008 | Stratton | H04L 12/185 |
| | | | | 370/260 |
| 2009/0326735 | A1* | 12/2009 | Wood | G05D 1/0027 |
| | | | | 701/2 |
| 2010/0256836 | A1* | 10/2010 | Mudalige | G08G 1/163 |
| | | | | 701/2 |
| 2012/0069131 | A1* | 3/2012 | Abelow | G06Q 10/067 |
| | | | | 348/14.01 |
| 2012/0239191 | A1* | 9/2012 | Versteeg | G06N 3/004 |
| | | | | 700/246 |
| 2013/0080360 | A1* | 3/2013 | Sterritt | G05B 13/02 |
| | | | | 706/14 |
| 2016/0156406 | A1* | 6/2016 | Frolov | H04B 7/18504 |
| | | | | 455/431 |
| 2016/0275801 | A1* | 9/2016 | Kopardekar | G08G 5/0043 |
| 2017/0129603 | A1* | 5/2017 | Raptopoulos | B64C 39/024 |
| 2017/0132334 | A1* | 5/2017 | Levinson | G06F 17/5009 |
| 2017/0370731 | A1* | 12/2017 | Bresnahan | G01C 21/3697 |
| 2019/0014172 | A1* | 1/2019 | Chaki | H04W 8/186 |

* cited by examiner

SYSTEMS AND METHODS FOR COLLABORATION BETWEEN AUTONOMOUS VEHICLES

TECHNICAL FIELD

The present disclosure generally relates to autonomous vehicles, and more particularly relates to systems and methods for collaboration between autonomous vehicles.

BACKGROUND

An autonomous vehicle is a vehicle that can sense its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, an autonomous vehicle may benefit from collaboration with other autonomous vehicles. Collaborating vehicles may be able to share sensor data and missions for their mutual benefit.

Accordingly, it is desirable to provide systems and methods for improving the collaboration between autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for collaboration between autonomous vehicles. In one embodiment, a processor-implemented method for coordinating travel between multiple autonomous vehicles is provided. The method includes sending a collaboration request to one or more vehicles in an area to form a group to perform a mission, receiving an acceptance of the collaboration request to join the group wherein the group includes a plurality of vehicles, cooperating in assigning leading functions for the group to one or more of the plurality of vehicles in the group, cooperating in mission negotiations for the group, cooperating in determining a formation for the group, and cooperating in generating a trajectory for the group. The vehicles in the group are operated in accordance with the determined formation and generated trajectory.

In one embodiment, sending a collaboration request includes receiving a request from a remote-control center to form a group and sending a collaboration request responsive to the request by the remote-control center.

In one embodiment, sending a collaboration request includes receiving a request from an occupant of a vehicle to form a group and sending a collaboration request responsive to the request by the occupant of the vehicle.

In one embodiment, sending a collaboration request includes an automatic determination by a vehicle to form a group and sending a collaboration request responsive to the automatic determination by the vehicle.

In one embodiment, cooperating in assigning leading functions includes requesting that a remote-control center identify one leader vehicle to perform all leading function or a plurality of vehicles to perform different leader functions.

In one embodiment, cooperating in assigning leading functions includes communicating the relative strength of software, a controller, and/or sensors to other vehicles in the group.

In one embodiment, cooperating in assigning leading functions includes determining the relative strength of the software, controller, and sensors for each vehicle in the group and assigning leading functions to one or more vehicles based on the relative strength of the software, controller and sensors of the one or more assigned vehicles.

In one embodiment, assigning leading functions includes assigning one leader vehicle to perform all leading functions.

In one embodiment, assigning leading functions includes assigning different leading functions to a plurality of the vehicles in the group.

In one embodiment, cooperating in mission negotiations includes agreeing to perform at least part of a proposed group mission.

In one embodiment, cooperating in mission negotiations includes agreeing to rescue operations or agreeing to a target for optimization during the performance of a mission.

In one embodiment, agreeing to a target for optimization includes agreeing to optimize for improved energy efficiency during travel, agreeing to optimize to reduce the time to a destination, agreeing to optimize for combined goals, or agreeing to optimize to lengthen vehicle service life.

In one embodiment, cooperating in determining a formation and cooperating in generating trajectories include sharing vehicle data with the vehicles in the group, the shared data including one or more of vehicle speed, direction, obstacles detected, requests to leave the group, and a distress call.

In one embodiment, cooperating in determining a formation and cooperating in generating trajectories include determining a formation based on the agreed to rescue operations or target for optimization, and based on shared data from the vehicles in the group.

In one embodiment, the method further includes operating one of the vehicles in the group in accordance with the determined formation and generated trajectory by applying instructions calculated for the group, the instructions including one or more of throttle, steering and braking instructions.

In another embodiment, a processor-implemented method in an autonomous vehicle for collaboration with another autonomous vehicle is provided. The method includes detecting, by a processor in a first vehicle, an abnormal state of a second vehicle, sending, by the processor, a collaboration request to the second vehicle, receiving, by the processor, an acceptance of the collaboration request, detecting a condition the second vehicle is unable to detect, and communicating information regarding the condition to the second vehicle.

In one embodiment, receiving an acceptance of the collaboration request includes receiving an indication of the condition the second vehicle is unable to detect.

In another embodiment, a processor-implemented method in an autonomous vehicle for collaboration with another autonomous vehicle is provided. The method includes detecting a need on a first vehicle for collaboration with a second vehicle, sending, by the processor, a collaboration request to the second vehicle, receiving, by the processor, an acceptance of the collaboration request, waiting for the second vehicle to detect a condition the first vehicle requests to be detected, and receiving the detected information regarding the condition at the first vehicle.

In one embodiment, sending a collaboration request includes searching for an autonomous vehicle in the area and sending the collaboration request to the autonomous vehicle in the area located during the searching.

In one embodiment, the method further includes calibrating a sensor using the received information.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
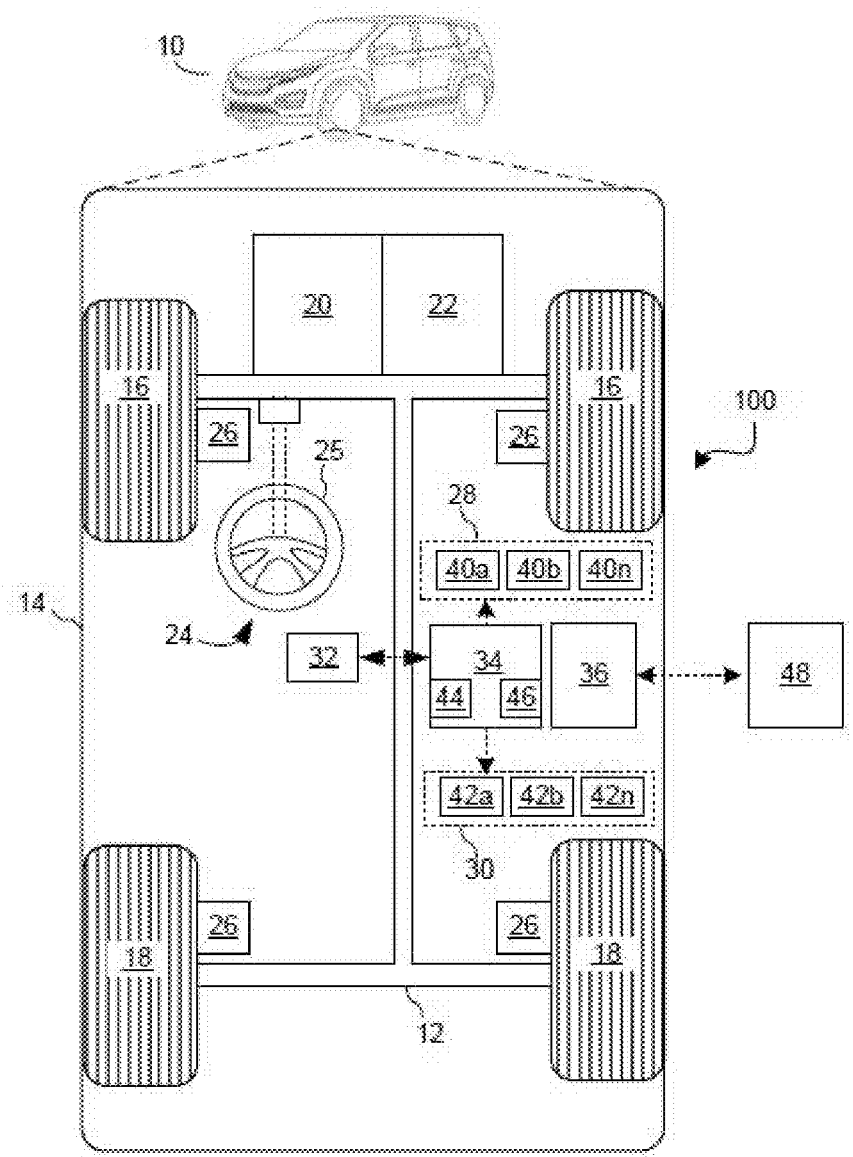
FIG. 1 is a functional block diagram illustrating an autonomous vehicle that includes a collaboration system, in accordance with various embodiments.

With reference to FIG. 1, a collaboration system shown generally as 100 is associated with a vehicle 10 in accordance with various embodiments. In general, the collaboration system (or simply "system") 100 allows an autonomous vehicle to collaborate with other autonomous vehicles to perform a mission and/or share sensor data.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the collaboration system 100 is incorporated into the autonomous vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016"

standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement a collaboration system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
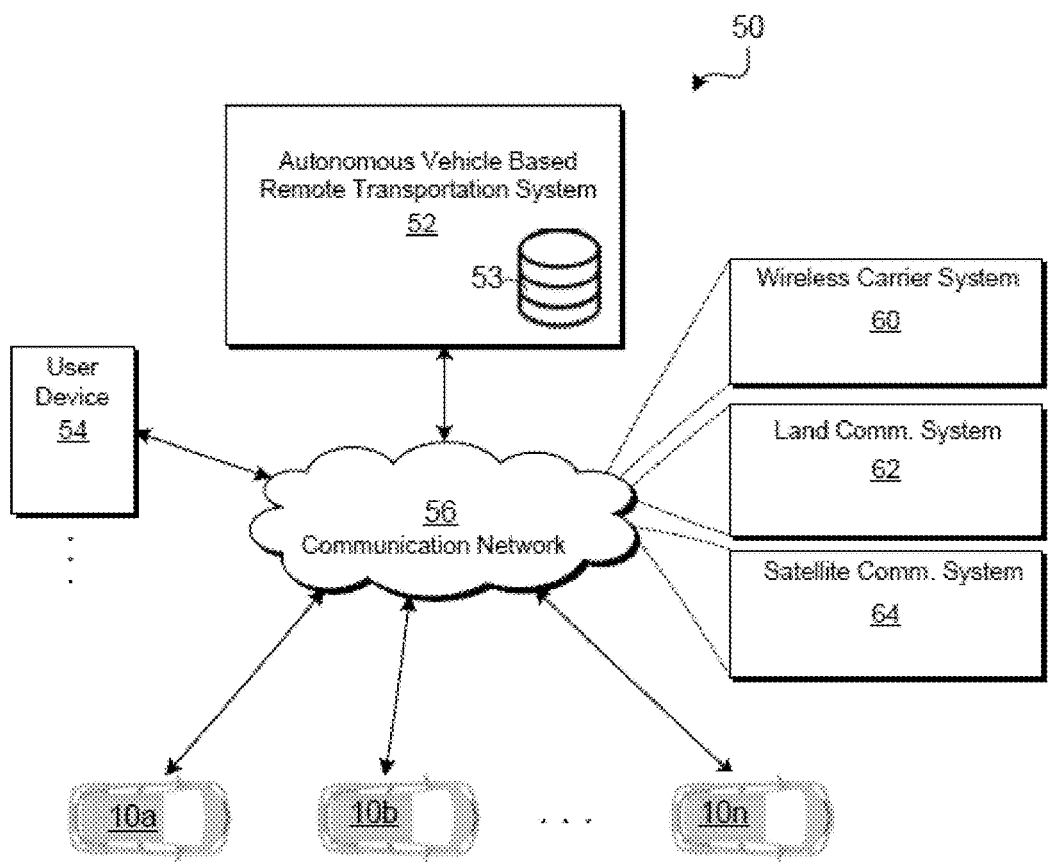
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented using a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
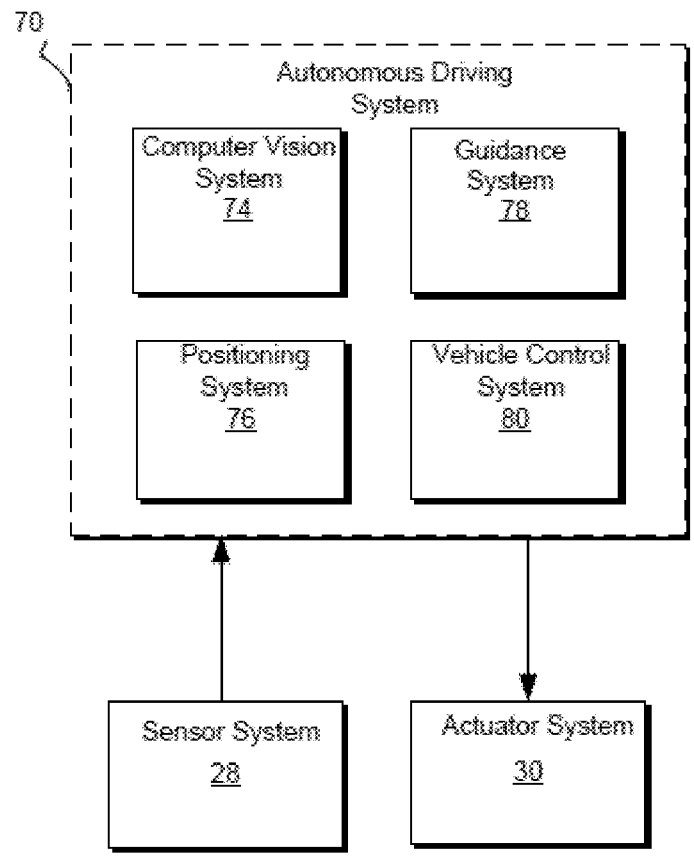
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes the acquired sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the collaboration system 100 may be included within the computer vision system 74, the positioning system 76, the guidance system 78, and/or the vehicle control system 80. As mentioned briefly above, the collaboration system 100 of FIG. 1 is configured to allow an autonomous vehicle to collaborate with other autonomous vehicles to perform a mission or share sensor data.

Figure 4A:
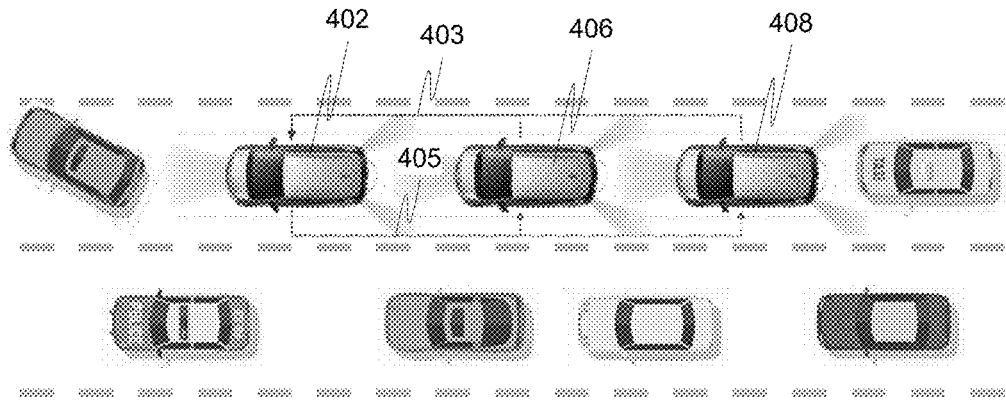
FIGS. 4A-4B present top-down views of example scenarios useful in understanding the present subject matter, in accordance with various embodiments.
Figure 4B:
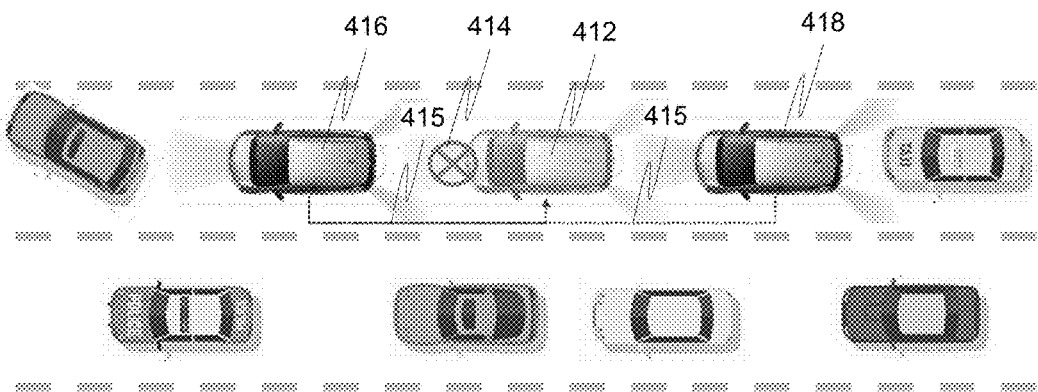

FIGS. 4A-4B present top-down views of example scenarios useful in understanding the present subject matter. More particularly, FIG. 4A illustrates a fleet of coordinated, cluster-moving autonomous vehicles traveling in formation (platooning) down a roadway. Many benefits, such as better fuel efficiency, faster travel time, and others, may be achieved through vehicle platooning. In this example, the platoon comprises a leader vehicle 402 and two resource vehicles 406, 408. The resource vehicles 406, 408 share information 403 from various sensors with the leader vehicle 402, for example, wirelessly using V2V communication. The leader vehicle 402 uses the shared information 402 to compute instructions 405 that the leader vehicle 402 provides to the resource vehicles 406, 408. By sharing information and following instructions provided by a leader vehicle 402, a stable formation of autonomous vehicles may be achieved by, for example, accelerating at the same time and rate, to achieve the benefits of platooning.

FIG. 4B illustrates an on-demand formation of a platoon to assist or rescue an autonomous vehicle 412 with a faulty component 414 or deteriorating function. With collaboration, other autonomous vehicles 416, 418 can take over certain functions for the problematic vehicle 412. As an example, the problematic vehicle 412 may have a faulty radar system and not be able to determine the distance to the vehicle 416 it is following. The problematic vehicle 412 may request that a platoon be formed to assist the problematic vehicle 412 in navigating. After forming the platoon, the other autonomous vehicles 416, 418 can share GPS information 415, for example, with the problematic vehicle 412 to allow the problematic vehicle 412 to determine the distance between it and the vehicle 416 it is following.

Figure 5:
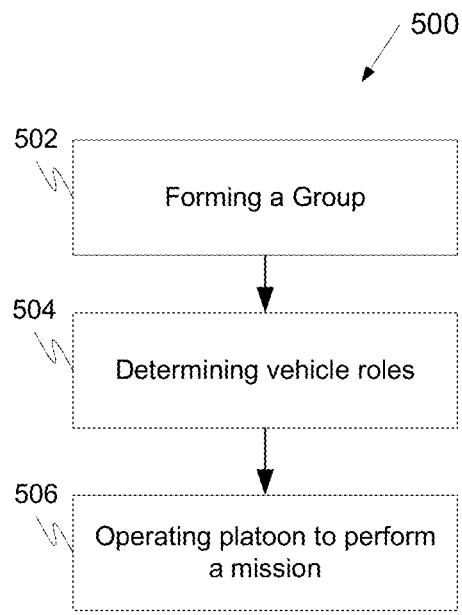
FIG. 5 is a process flow chart depicting an example process for platooning autonomous vehicles, in accordance with various embodiments.

FIG. 5 is a process flow chart depicting an example process 500 for platooning autonomous vehicles. The example process 500 includes forming a group (operation 502). Forming a group may involve an entity requesting the formation of a group, the identification of autonomous vehicles in an area to form the group, a request being sent to identified vehicles to join the group, and vehicles agreeing to participate in the group.

The example process 500 also includes determining vehicle roles in the group (operation 504) once agreement to form a group has been reached. A vehicle may be selected as the leader of the group or multiple vehicles may be selected to perform different leader functions. Leader functions may include providing driving instructions, trajectory planning, mission determination, etc. The one or more vehicles selected to perform leader functions may be chosen based on the relative strength of the vehicle's controller, software, and/or sensors relative to other autonomous vehicles in the group.

Finally, the example process 500 includes operating the group to perform a mission (operation 506). Operating the group to perform a mission may involve selecting and agreeing to a mission and/or targets for optimization during the performance of the mission, generating instructions for vehicles in the group to perform in furtherance of the mission, and operating the group vehicles in compliance with the instructions.

Figure 6:
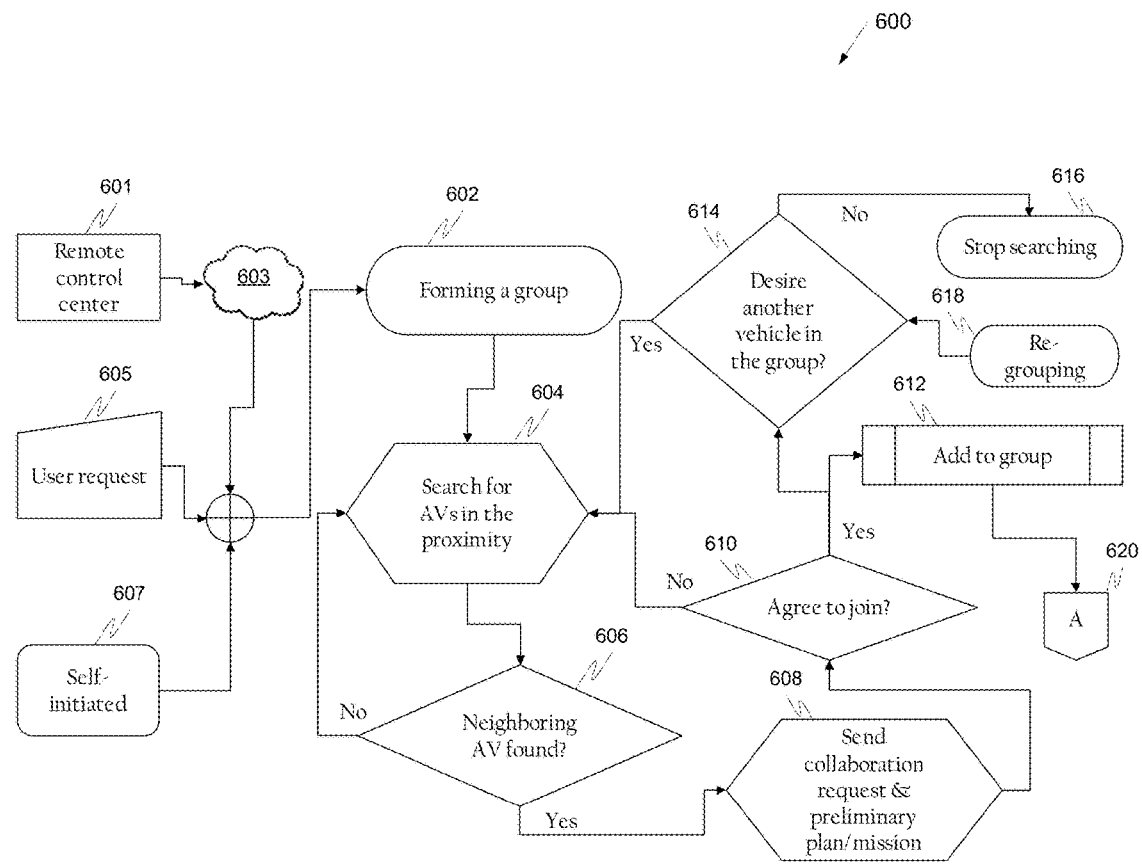
FIG. 6 is a process flow chart depicting an example process in an autonomous vehicle for forming a group, in accordance with various embodiments.

FIG. 6 is a process flow chart depicting an example process 600 in an autonomous vehicle for forming a group. A request to form a group can be made by a remote-control center 601 over a network 603 to a first vehicle, as a user request 605 from an occupant of the first vehicle, or as a self-initiated request 607 by the first vehicle, for example, automatically based on pre-determined criteria. After receipt of a request, the first vehicle can start the process 600 of forming the group (operation 602).

The example process 600 includes searching for autonomous vehicles near the first vehicle (operation 604). A determination is made regarding whether neighboring autonomous vehicles are found near the first vehicle (decision 606). If a neighboring vehicle is not found (no at decision 606), the first vehicle continues to search for autonomous vehicles in its proximity (operation 604). If a neighboring vehicle is found (yes at decision 606), the first vehicle may send a collaboration request to join a group and a preliminary plan/mission to the identified neighboring vehicle (operation 608).

Responsive to receipt of a response from the neighboring vehicle to join the group, a determination is made regarding whether the neighboring autonomous vehicle has agreed to join the group (decision 610). If the neighboring vehicle has not agreed to join the group (no at decision 610), the first vehicle continues to search for autonomous vehicles in its proximity (operation 604). If the neighboring vehicle has agreed to join the group (yes at decision 610), the neighboring vehicle is added to the group (operation 612).

Also, if the neighboring vehicle has agreed to join the group (yes at decision 610), a decision is made regarding whether another vehicle is desired in the group (decision 614). If another vehicle is not desired in the group (no at decision 614), the first vehicle stops searching for autonomous vehicles in its proximity (operation 616). If another vehicle is desired in the group (yes at decision 614), the first vehicle continues to search for autonomous vehicles in its proximity (operation 604).

Also, if regrouping is desired (operation 618), a decision is made regarding whether another vehicle is desired in the group (decision 614). If another vehicle is not desired in the group (no at decision 614), the first vehicle stops searching for autonomous vehicles in its proximity (operation 616). If another vehicle is desired in the group (yes at decision 614), the first vehicle continues to search for autonomous vehicles in its proximity (operation 604). After the group is formed, a process for determining the roles of vehicles in the group may be performed (operation 620).

Figure 7:
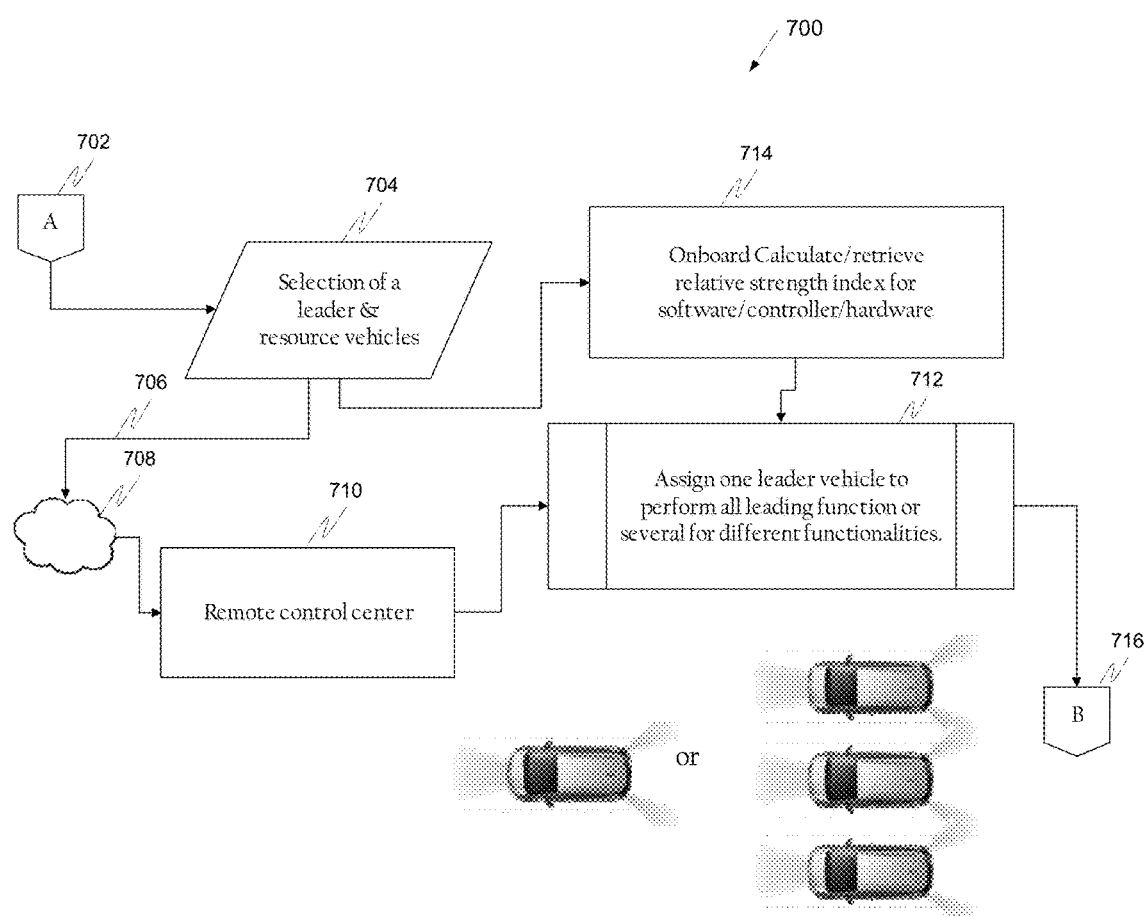
FIG. 7 is a process flow chart depicting an example process for determining vehicle roles in a group, in accordance with various embodiments.

FIG. 7 is a process flow chart depicting an example process 700 for determining vehicle roles in a group. The example process 700 may be entered when the example process 600 for forming a group has concluded (operation 702). The example process 700 includes the selection of a leader and resource vehicles (operation 704). Selection of a leader and resource vehicles may be made by the first vehicle or by a remote-control center.

In the case of leader selection by a remote-control center, the first vehicle may send a request 706 via a network 708 for a remote-control center 710 to select a leader and resource vehicles. The remote-control center 710 can evaluate the relative strength of the software, controller, and hardware sensors onboard each of the vehicles in the group to determine which vehicle(s) should function as a leader. After the evaluation, the remote-control center 710 can assign one leader vehicle to perform all leading functions or a plurality of vehicles to perform different functions (operation 712).

In the case of leader selection by the first vehicle, the first vehicle can retrieve and calculate a relative strength index for the software, controller, and hardware sensors onboard each of the vehicles in the group to determine which vehicle(s) should function as a leader (operation 714). After the evaluation, the first vehicle can assign one leader vehicle to perform all leading functions or a plurality of vehicles to perform different functions (operation 712). The leader vehicle may be the first vehicle or some other vehicle in the group. After the leader is selected, a process for directing the vehicles in the group may be performed (operation 716).

Figure 8:
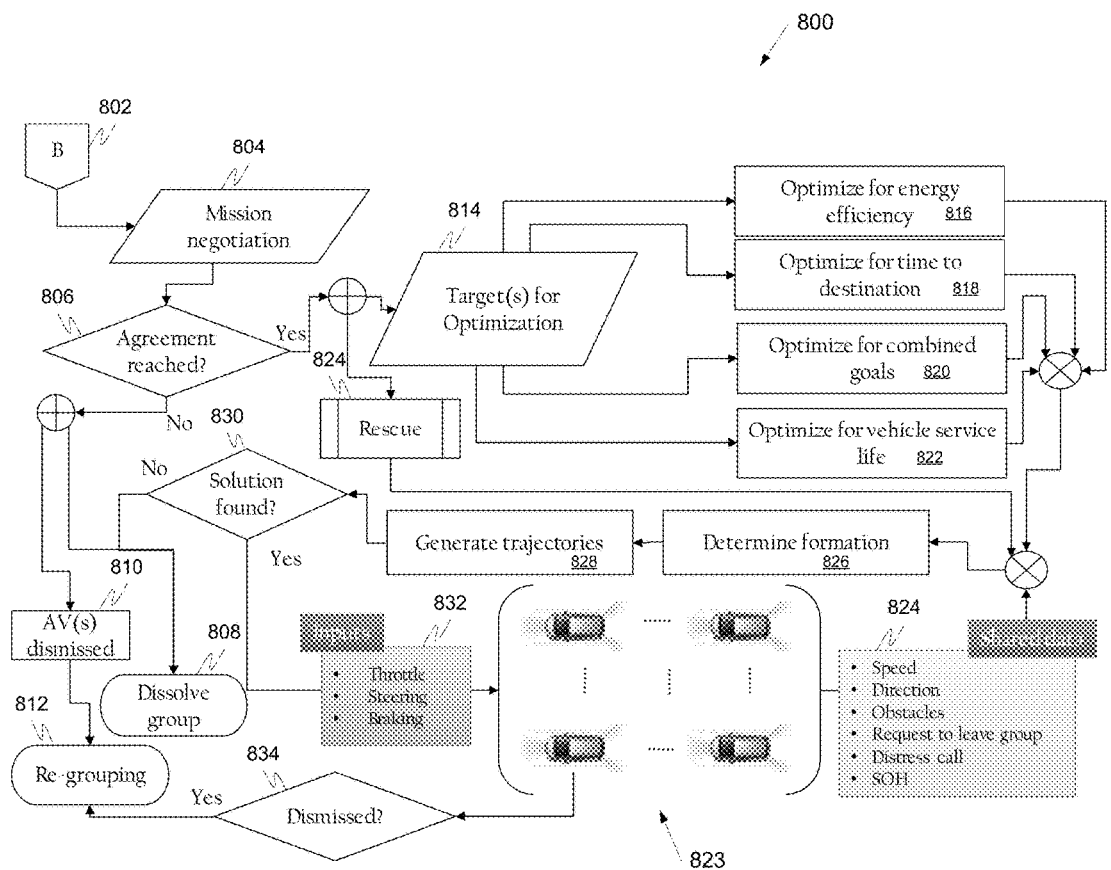
FIG. 8 is a process flow chart depicting an example process in an autonomous vehicle for directing the vehicles in a group, in accordance with various embodiments.

FIG. 8 is a process flow chart depicting an example process 800 in an autonomous vehicle for directing the vehicles in a group. The example process 800 may be entered when the example process 700 for selecting a leader has concluded (operation 802). The example process 800 includes mission negotiation (operation 804). During mission negotiation, the leader vehicle identifies the mission, for example, travel to a destination, assist a vehicle experiencing abnormal operations, and others. Vehicles in the group may agree to perform part or all of the proposed mission, for example, a vehicle may agree to travel to point A but not to continue to point B.

A decision is made regarding whether agreement has been reached on a mission (decision 806). If agreement is not reached (no at decision 806), the group may be dissolved and no replacement group formed (operation 808). Alternatively, if agreement is not reached (no at decision 806), one or more autonomous vehicles may be dismissed from the group (operation 810) and re-grouping may take place to form a new group (operation 812). Re-grouping may be performed in accordance with operation 618 of example process 600.

If agreement is reached on a mission (yes at decision 806), a target for optimization during the mission may be identified (operation 814). Example targets for optimization include optimizing the mission to improve energy efficiency during the mission (operation 816). For example, energy efficiency may be improved by platooning the vehicles in a tight arrangement such that drafting or slipstreaming occurs, which can reduce average energy expenditure required to maintain a speed. Another target for optimization includes optimizing the mission to reduce the time to the destination (operation 818). For example, operating the vehicles in a tight formation wherein the vehicles brake and accelerate concurrently may result in the platooned vehicles reaching a destination sooner. Another target for optimization includes optimizing the mission for combined goals (e.g., for both improved energy efficiency and reduced time to destination) (operation 820). Another target for optimization includes optimizing the mission to lengthen vehicle service life (operation 822). For example, the brake life may be lengthened by reducing the frequency of hard braking through coordinating the autonomous vehicles in the group. Alternatively, agreement on a mission (yes at decision 806), may also involve agreement to a rescue mission (operation 824).

With a rescue mission or a mission with a target for optimization, the autonomous vehicles in the group 823 share data 824 with the other autonomous vehicles in the group 823. The shared data 824 may include vehicle speed, direction, detected obstacles, a request to leave group, a distress call, SOH (state-of-health), and others.

Based on the shared data and the mission choice, a vehicle with leader functions determines the formation for the group (operation 826) and generates trajectories for the group (operation 828). A determination is made regarding whether the formation and trajectories can be translated into instructions for the vehicles in the group (decision 830). If a solution is available for translating the formation and trajectories into instructions (yes at decision 830), the instructions are provided as inputs (832) to each of the vehicles in the group 823. If a solution is not available for translating the formation and trajectories into instructions (no at decision 830), the group may be dissolved (operation 808).

A vehicle may request, at any time to be dismissed from the group. If a vehicle is dismissed from a group (yes at decision 834), re-grouping may take place to form a new group (operation 812). Re-grouping may be performed in accordance with operation 618 of example process 600.

Figure 9:
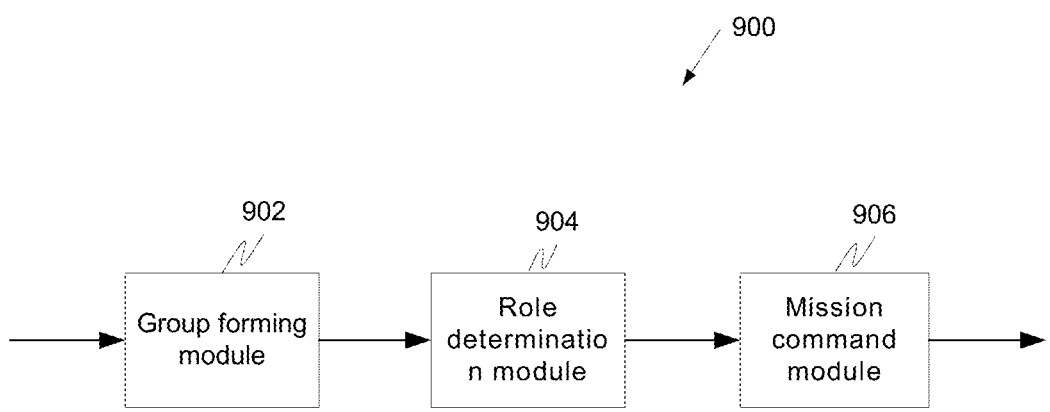
FIG. 9 is a block diagram depicting an example system in an autonomous vehicle for operating the vehicle in a platoon, in accordance with various embodiments.

FIG. 9 is a block diagram depicting an example collaboration system 900 in an autonomous vehicle for operating the vehicle in a platoon. The example system 900 includes a group forming module 902, a role determination module 904, and a mission command module 906.

The example group forming module 902 is configured to: (a) search for other autonomous vehicles near the vehicle, (b) send a collaboration request to other vehicles in proximity with a preliminary mission statement, (c) receive and interpret responses to a collaboration request, (d) respond to a collaboration request by other vehicles after considering a preliminary mission statement received with the collaboration request, (e) add vehicles that accepted a collaboration request to a group, and (f) determine the number of vehicles desired for a group.

The example role determination module is configured to: (a) provide the relative strength of its vehicle's software, controller, and/or sensors to other vehicles in a group, (b) receive and evaluate the relative strength of the software, controller, and sensors for other vehicles in the group, (c) assign leading functions to one or more vehicles based on the relative strength of each vehicle's software, controller and sensors, wherein assigning leading functions comprises assigning one leader vehicle to perform all leading functions or assigning different leading functions to different vehicles in the group, and (d) accept and perform one or more leading functions or a leading role in a group.

The example mission command module 906 is configured to: (a) select and propose a group mission and negotiate regarding a proposed group mission; (b) select and propose a group rescue operation and negotiate regarding a proposed group rescue operation; (c) select and propose a target for optimization during the performance of a mission and negotiate regarding a proposed target for optimization during the performance of a mission; (d) determine a formation for a group and generate a trajectory for the group; (e) share vehicle data to the other vehicle in the group; and (f) generate instructions to accomplish a determined group formation and generated group trajectory.

An autonomous vehicle may include one or more of a group forming module 902, a role determination module 904, and a mission command module 906. The specific group forming module 902, role determination module 904, and mission command module 906 incorporated in an autonomous vehicle may perform one or more of the features described above and additional features.

Figure 10:
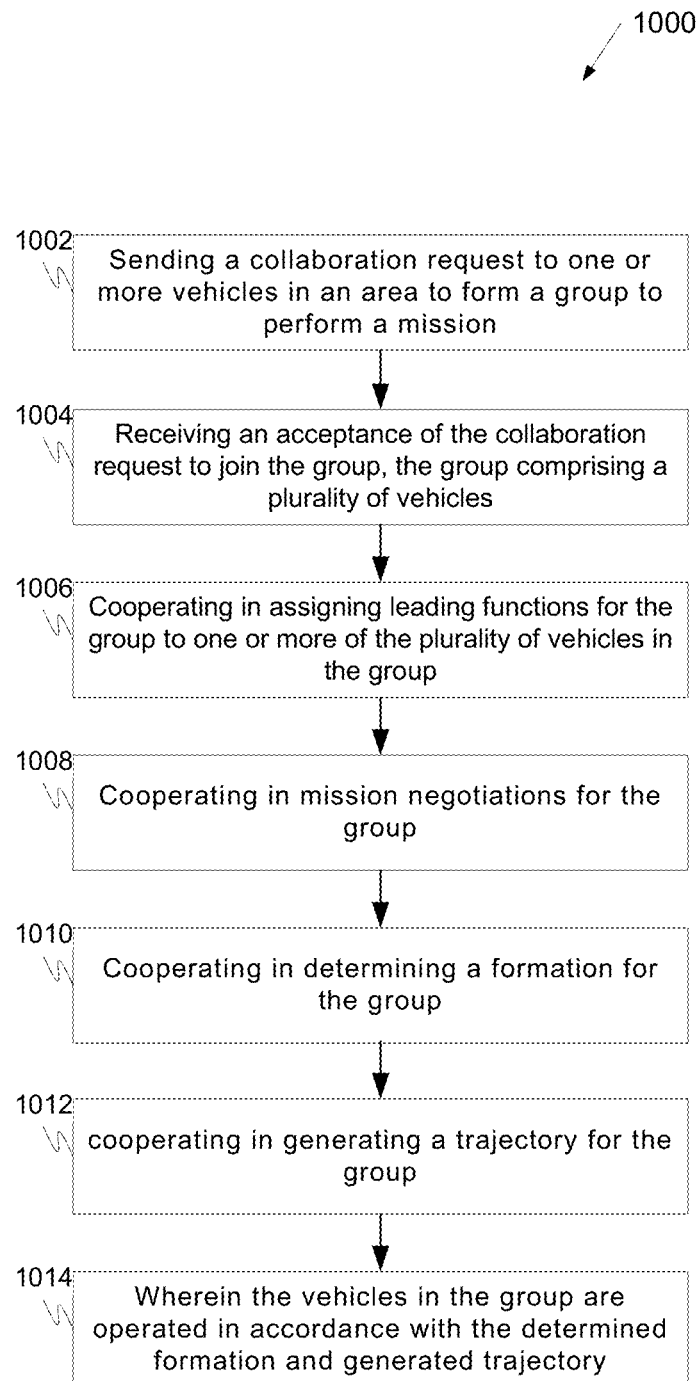
FIG. 10 is a process flow chart in an example autonomous vehicle depicting an example process for operating the vehicle within a group of autonomous vehicles, in accordance with various embodiments.

FIG. 10 is a process flow chart in an example autonomous vehicle depicting an example process 1000 for operating the vehicle within a group of autonomous vehicles. The example process 1000 includes sending a collaboration request to one or more vehicles in an area to form a group to perform a mission (operation 1002). The collaboration request may be sent in response to the vehicle determining that a group should be formed or in response to a vehicle occupant determining that a group should be formed. Sending a collaboration request may include searching for autonomous vehicles in the area and sending the collaboration request to an autonomous vehicle identified during the search. The collaboration request may include a proposed mission for the group. The proposed mission may include a rescue operation or a mission with a target for optimization during the performance of the mission. The example process 1000 further includes receiving an acceptance of the collaboration request to join the group wherein the group comprises a plurality of autonomous vehicles (operation 1004).

The example process 1000 includes cooperating in assigning leading functions for the group to one or more of the plurality of vehicles in the group (operation 1006). Cooperating in assigning leading functions may include communicating the relative strength of software, a controller, and/or sensors to other vehicles in the group. Cooperating in assigning leading functions may include determining the relative strength of the software, controller, and sensors for each vehicle and assigning leading functions to one or more vehicles based on the relative strength of the vehicle's software, controller and sensors. Assigning leading functions may include assigning one leader vehicle to perform all leading functions for the group or assigning different leading functions to different vehicles in the group.

The example process 1000 includes cooperating in mission negotiations for the group (operation 1008). Cooperating in mission negotiations may include proposing a group mission or agreeing to perform at least part of a proposed group mission. Cooperating in mission negotiations may include proposing a rescue operation or agreeing to a proposed rescue operation. Cooperating in mission negotiations may include proposing or agreeing to a target for optimization during the performance of the mission. The target for optimization may include optimization for energy efficiency, optimization for reducing time to destination, optimization for combined goals, or optimization to improve vehicle service life.

The example process 1000 includes cooperating in determining a formation for the group (operation 1010) and cooperating in generating a trajectory for the group (operation 1012). Cooperating in determining a formation and cooperating in generating trajectories may include sharing vehicle data with other vehicles in the group. The shared data may include one or more of vehicle speed, direction, obstacles detected, requests to leave the group, and a distress call. Cooperating in determining a formation may include determining a formation based on an agreed to rescue operation or target for optimization, and based on shared data from the vehicles in the group. Cooperating in generating a trajectory may include generating a trajectory based on an agreed to rescue operation or target for optimization, and based on shared data from the vehicles in the group.

The example process 1000 includes operating the vehicles in accordance with the determined formation and generated trajectory (operation 1014). Operating a vehicle in accordance with the determined formation and generated trajectory may include implementing inputs calculated for the vehicles in the group. The inputs may include a throttle instruction, a steering instruction and/or a braking instruction.

Figure 11A:
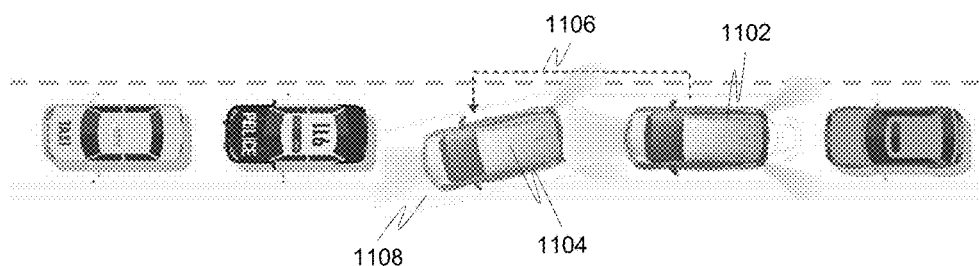
FIGS. 11A-11C present top-down views of example scenarios useful in understanding collaboration between autonomous vehicles to combat a faulty sensor or other sensor limitations, in accordance with various embodiments.
Figure 11B:
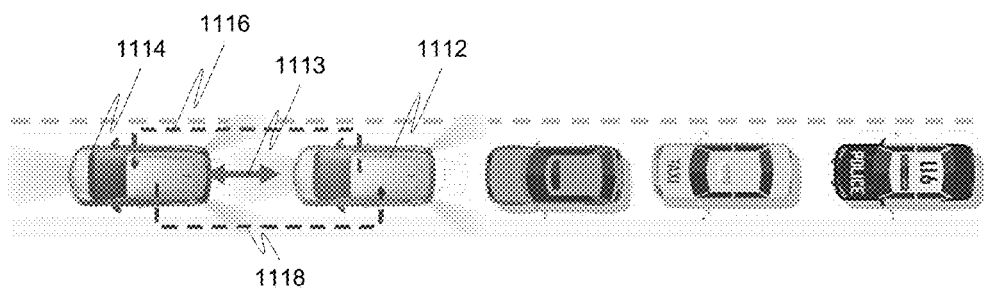
Figure 11C:
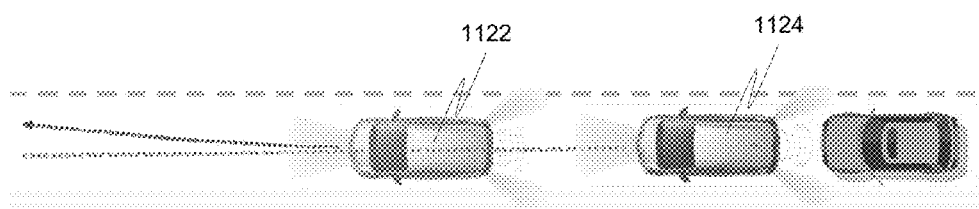

FIGS. 11A-11C present top-down views of example scenarios useful in understanding collaboration between autonomous vehicles to combat a faulty sensor or other sensor limitations. An autonomous vehicle can rely heavily on on-board sensors to detect surrounding conditions when performing its mission. A malfunctioning sensor may delay an autonomous vehicle's mission, lead to a mission being aborted, or lead to an autonomous vehicle becoming stranded. Moreover, conditions that impair a vehicle's performance, such as a foreign object stuck on the vehicle, may at times not be detectable by the vehicle's sensors. In cases such as these, collaboration with another autonomous vehicle can provide a vehicle with increased awareness of surrounding conditions to overcome its sensor limitations.

More particularly, FIG. 11A illustrates an example scenario for other-initiated collaboration wherein one autonomous vehicle 1102 detects abnormal behavior by a second autonomous vehicle 1104 caused by a faulty sensor and reports 1106 the abnormal behavior to the second autonomous vehicle 1104. In this example, the first vehicle 1102 observed that the second vehicle 1104 crossed the lane divider lines 1108 and reported this condition to the second vehicle 1104. This notification alerted the second vehicle 1104 that it may have a faulty sensor that allowed it to cross the lane divider lines. Alerted of this condition, the second vehicle 1104 may take corrective action.

FIG. 11B illustrates an example scenario for self-initiated collaboration wherein a first autonomous vehicle 1112 observes that it is receiving conflicting information from its sensors. As an example, the distance 1113 between the first vehicle 1112 and a second vehicle 1114 may be provided to the vehicle 1112 by both a camera sensor and a radar sensor. The distances provided by each of these sensors may not agree with each other—one of the sensors may be malfunctioning and not providing accurate information. Without knowing which sensor is malfunctioning, the mission of the vehicle 1112 may be adversely impacted.

When receiving conflicting information, a first autonomous vehicle 1112 can collaborate with a second autonomous vehicle 1114 and initiate an assistance request 1116 to the second autonomous vehicle 1114 requesting that the second autonomous vehicle 1114 provide reference data 1118 or an arbitration 1118.

FIG. 11C illustrates an example scenario for self-initiated collaboration wherein a first autonomous vehicle 1122 determines that a sensor associated with the first vehicle 1122 needs to be adjusted or calibrated. Certain sensors, for example, wheel balance sensors, may not always produce accurate information without reaffirming with reference information—wheel balance sensors may need reference data for an occasional calibration. A first autonomous vehicle 1122 may request reference data from a second autonomous vehicle 1124 the can be used by the first autonomous vehicle 1122 to adjust or calibrate a sensor.

Figure 12:
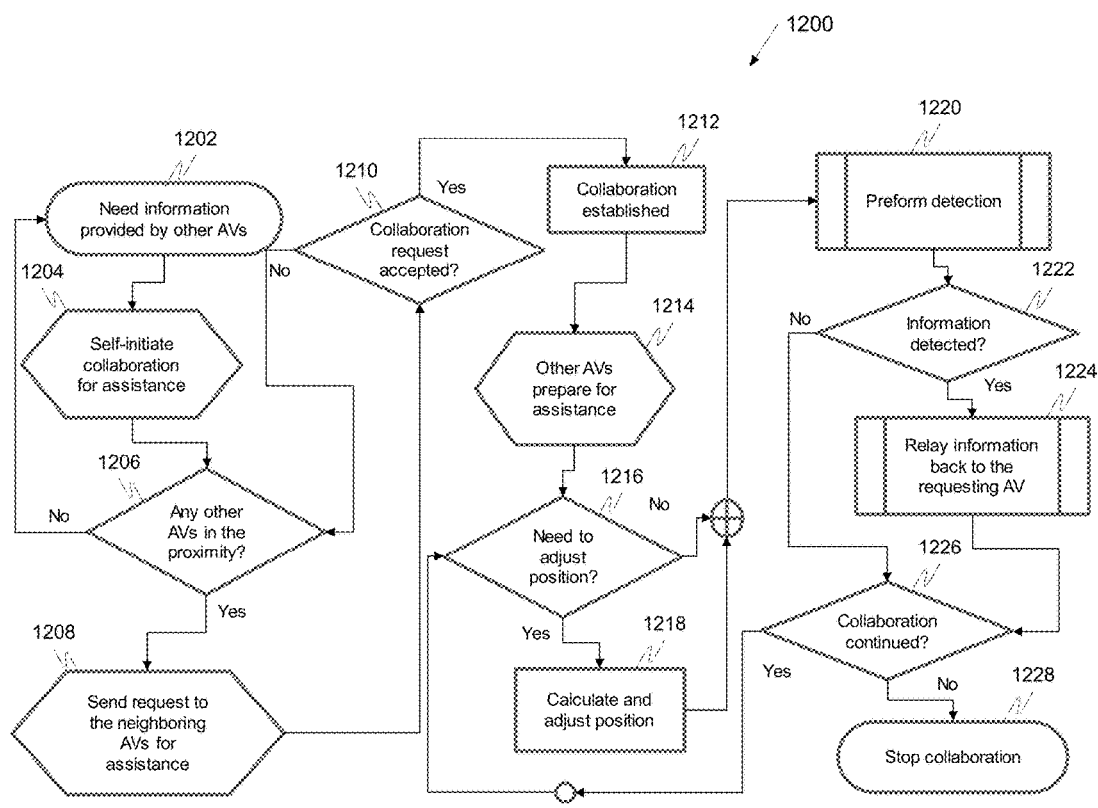
FIG. 12 is a process flowchart illustrating an example process for self-initiated collaboration, in accordance with various embodiments.

FIG. 12 is a process flowchart illustrating an example process 1200 for self-initiated collaboration. The example process 1200 includes a determination of a need for sensor information provided by other autonomous vehicles (operation 1202). Upon the determination of the need, a first autonomous vehicle can self-initiate collaboration for assistance (operation 1204). The first autonomous vehicle searches for other autonomous vehicles that are near the first autonomous vehicle and determines if other autonomous vehicles are in its vicinity (decision 1206). If other autonomous vehicles are not in the vicinity (no, at decision 1206), the first autonomous vehicle reevaluates its need for sensor information provided by other autonomous vehicles (operation 1202). If other autonomous vehicles are in the vicinity (yes, at decision 1206), the first vehicle sends a request to neighboring autonomous vehicles for assistance (operation 1208).

A determination is made regarding whether the collaboration request was accepted by a neighboring vehicle (decision 1210). If the collaboration request was not accepted by a neighboring vehicle (no at decision 1210), the first autonomous vehicle searches for other autonomous vehicles that are near the first autonomous vehicle and determines if other autonomous vehicles are in its vicinity (decision 1206). If the collaboration request was accepted by a neighboring vehicle (yes at decision 1210), collaboration is established between the first vehicle and the accepting neighboring vehicle (operation 1212). The accepting neighboring vehicle prepares for assistance (operation 1214).

A determination is made regarding whether the accepting neighboring vehicle needs to adjust its position to effectively collaborate (decision 1216). If the accepting neighboring vehicle needs to adjust its position to effectively collaborate (yes at decision 1216), the accepting neighboring vehicle calculates and adjusts its position (operation 1218). The accepting neighboring vehicle performs detection operations to assist the first vehicle (operation 1220) after calculating and adjusting its position (operation 1218) or if the accepting neighboring vehicle does not need to adjust its position to effectively collaborate (no at decision 1216).

A determination is made regarding whether the accepting neighboring vehicle detected the information needed by the first vehicle (decision 1222). If the accepting neighboring vehicle detected the information needed by the first vehicle (yes at decision 1222), the accepting neighboring vehicle relays the information back to first autonomous vehicle (operation 1224).

A determination is made regarding whether collaboration between the first autonomous vehicle and the accepting neighboring vehicle will continue (decision 1226) after the accepting neighboring vehicle relays the information back to first autonomous vehicle (operation 1224) or if the accepting neighboring vehicle has not detected the information needed by the first vehicle (no at decision 1222). If collaboration between the first autonomous vehicle and the accepting neighboring vehicle will continue (yes at decision 1226), a determination is made regarding whether the accepting neighboring vehicle needs to adjust its position to effectively collaborate (decision 1216). If collaboration between the first autonomous vehicle and the accepting neighboring vehicle will not continue (no at decision 1226), collaboration is stopped (operation 1228).

Figure 13:
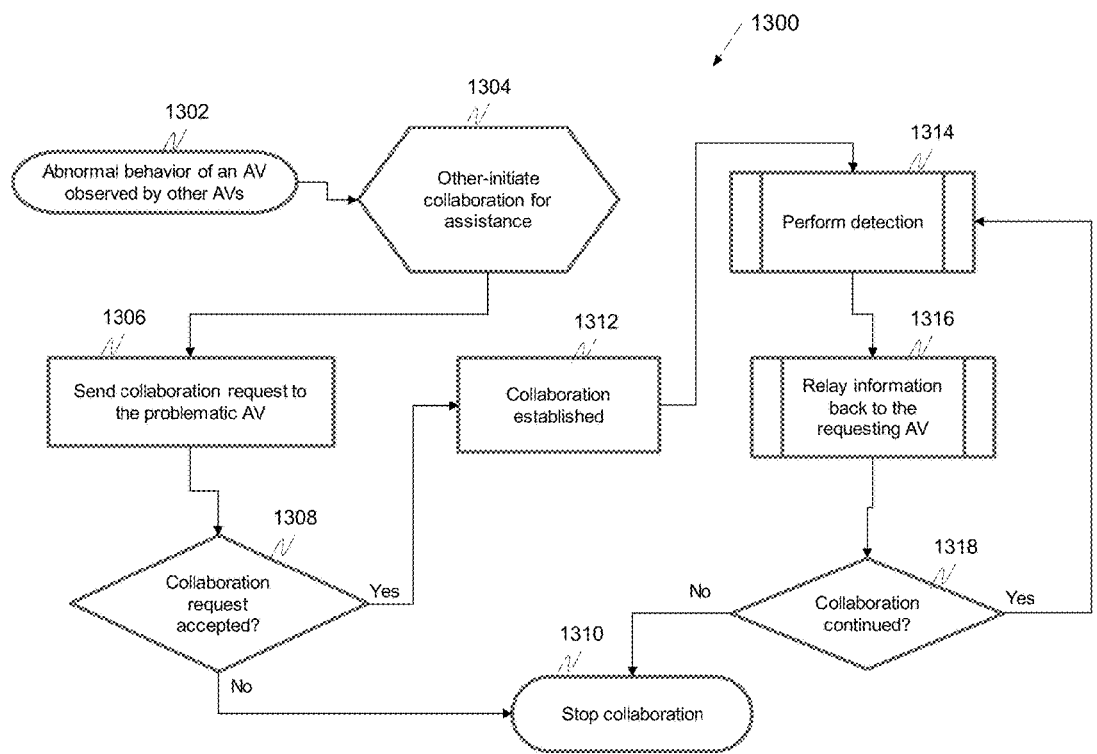
FIG. 13 is a process flowchart illustrating an example process for other-initiated collaboration, in accordance with various embodiments.

FIG. 13 is a process flowchart illustrating an example process 1300 for other-initiated collaboration. In the example process 1300, abnormal behavior by a first autonomous vehicle is observed by a second autonomous vehicle (operation 1302). The second autonomous vehicle can commence other-initiated collaboration for assistance (operation 1304). The second autonomous vehicle can send a collaboration request to the first autonomous vehicle (e.g., problematic autonomous vehicle) (operation 1306).

A determination is made by the second autonomous vehicle regarding whether the collaboration request has been accepted by the problematic vehicle (decision 1308). If the collaboration request has not been accepted (no at decision 1308), collaboration attempts may end (operation 1310). If the collaboration request has been accepted (yes at decision 1308), collaboration between the second vehicle and the problematic vehicle can be established (operation 1312). After collaboration between the second vehicle and the problematic vehicle has been established, the second vehicle may perform detection operations (operation 1314). After performing detection operations, the second vehicle may relay the detected information to the problematic vehicle (operation 1316).

A determination is made regarding whether collaboration between the second vehicle and the problematic vehicle will continue (decision 1318). If collaboration between the second vehicle and the problematic vehicle will continue (yes at decision 1318), the second vehicle may perform detection operations again (operation 1314). If collaboration between the second vehicle and the problematic vehicle will not continue (no at decision 1318), collaboration is stopped (operation 1310).

Figure 14:
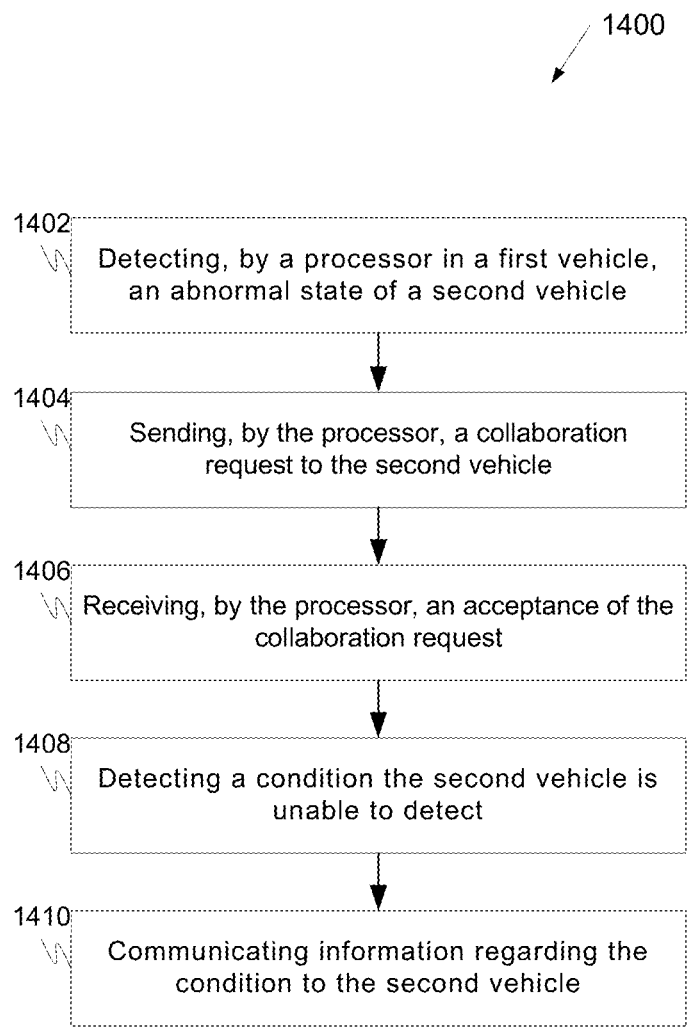
FIG. 14 is a process flowchart illustrating an example process in an autonomous vehicle for collaboration with another autonomous vehicle, in accordance with various embodiments.

FIG. 14 is a process flowchart illustrating an example process 1400 in an autonomous vehicle for collaboration with another autonomous vehicle. The example process 1400 includes detecting, by a processor in a first vehicle, an abnormal state of a second vehicle (operation 1402), sending, by the processor, a collaboration request to the second vehicle (operation 1404), and receiving, by the processor, an acceptance of the collaboration request (operation 1406). In some examples, receiving an acceptance of the collaboration request comprises receiving an indication of the condition the second vehicle is unable to detect. The example process 1400 further includes detecting a condition the second vehicle is unable to detect (operation 1408) and communicating information regarding the condition to the second vehicle (operation 1410).

Figure 15:
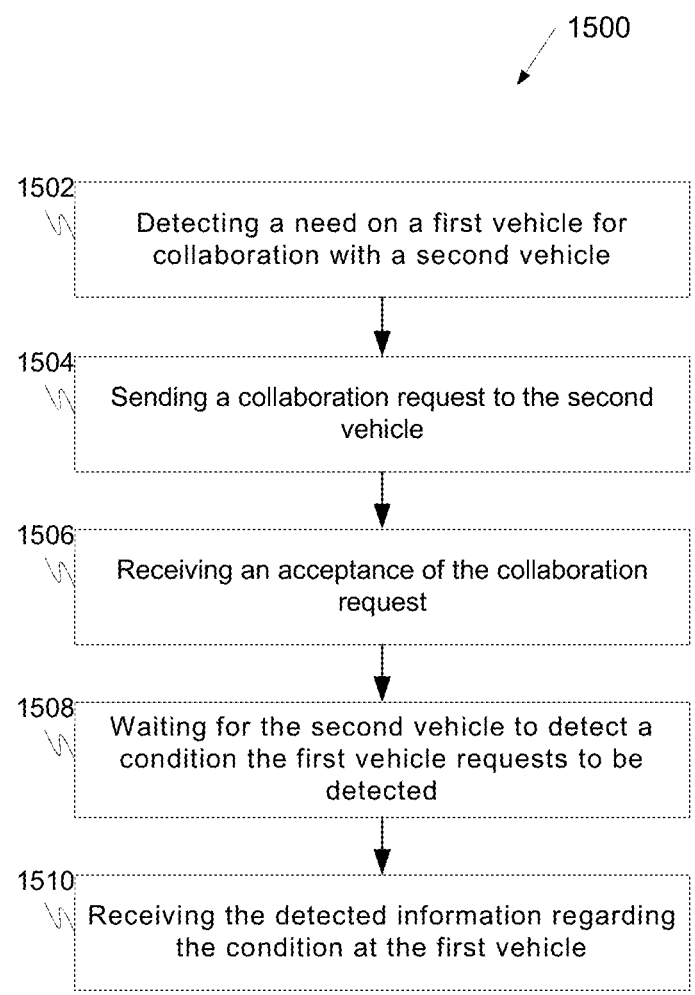
FIG. 15 is a process flowchart illustrating another example process in an autonomous vehicle for collaboration with another autonomous vehicle, in accordance with various embodiments.

FIG. 15 is a process flowchart illustrating another example process 1500 in an autonomous vehicle for collaboration with another autonomous vehicle. The example process 1500 includes detecting a need on a first vehicle for collaboration with a second vehicle (operation 1502) and sending a collaboration request to the second vehicle (operation 1504). In some examples, sending a collaboration request includes searching for an autonomous vehicle in the area and sending the collaboration request to the autonomous vehicle in the area located during the searching. The example process 1500 further includes receiving an acceptance of the collaboration request (operation 1506) and waiting for the second vehicle to detect a condition the first vehicle requests to be detected (operation 1508). In some examples, waiting for the second vehicle to detect a condition the first vehicle is unable to detect comprises waiting for the second vehicle to calculate and adjust its position. The example process 1500 further includes receiving the detected information regarding the condition at the first vehicle (operation 1510). In some examples, a sensor may be calibrated at the first vehicle using the received information.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A processor-implemented method for coordinating travel between multiple autonomous vehicles, the method comprising:
   sending, by a first processor in a first autonomously driven vehicle, a collaboration request to one or more autonomously driven vehicles to travel together along a roadway as a group of autonomous vehicles;
   receiving, by the first processor, an acceptance of the collaboration request to join the group of autonomous vehicles;
   calculating, by a second processor, a relative strength index for the software, controller, and hardware sensors onboard an autonomous vehicle for each vehicle in the group, wherein the second processor may or may not be in the first autonomously driven vehicle;
   assigning, by the second processor, an autonomous vehicle to function as a leader for mission planning for the group based on the relative strength index of the autonomous vehicle and an autonomous vehicle to function as a leader for formation planning and trajectory planning for the group based on the relative strength index of the autonomous vehicle, wherein the autonomous vehicle assigned as the leader for mission planning may or may not be the same autonomous vehicle assigned as the leader for formation planning and trajectory planning;
   identifying, by a third processor which is in the vehicle assigned to function as a leader for mission planning, a mission for a group and a target for optimization during the mission when agreement on the mission is reached by a plurality of the vehicles in the group;
   determining, by a fourth processor which is in the vehicle assigned to function as a leader for formation planning and trajectory planning, a formation for the group;
   generating, by the fourth processor, a trajectory for the group;
   translating, by the fourth processor, the formation and trajectory into instructions for the vehicles in the group, and
   providing, by the fourth processor, the instructions to the vehicles in the group;
   wherein the vehicles in the group are operated in accordance with the determined formation and generated trajectory.

2. The method of claim 1, wherein sending a collaboration request comprises receiving at a first vehicle a request from a remote-control center to form a group and sending a collaboration request from the first vehicle responsive to the request by the remote-control center.

3. The method of claim 1, wherein sending a collaboration request comprises receiving a request from an occupant of a first vehicle to form a group and sending a collaboration request from the first vehicle responsive to the request by the occupant of the vehicle.

4. The method of claim 1, wherein sending a collaboration request comprises an automatic determination by a first vehicle to form a group and sending a collaboration request from the first vehicle responsive to the automatic determination by the vehicle.

5. The method of claim 1, wherein the second processor is in a remote-control center.

6. The method of claim 1, wherein the second processor is in one of the plurality of autonomous vehicles.

7. The method of claim 1, wherein
assigning an autonomous vehicle to function as a leader comprises assigning leading functions to one or more vehicles based on the relative strength of the software, controller and sensors of the one or more assigned vehicles.

8. The method of claim 1, wherein the target for optimization comprises reducing the time to a destination.

9. The method of claim 1, wherein the target for optimization comprises lengthening vehicle service life.

10. The method of claim 1, wherein the mission comprises travelling to a destination.

11. The method of claim 1, wherein the mission comprises assisting a vehicle experiencing abnormal operations.

12. The method of claim 1, wherein the target for optimization comprises improving energy efficiency during travel.

13. The method of claim 1, wherein determining a formation for the group and generating a trajectory for the group comprise receiving vehicle data from each of the other vehicles in the group, the received vehicle data including one or more of vehicle speed, direction, obstacles detected, requests to leave the group, and a distress call.

14. The method of claim 1, wherein determining a formation for the group and generating a trajectory for the group comprise determining a formation based on agreed to rescue operations or target for optimization, and based on shared data from the vehicles in the group.

15. The method of claim 1, further comprising operating one of the vehicles in the group in accordance with the determined formation and generated trajectory by applying instructions calculated for the group, the instructions including one or more of throttle, steering and braking instructions.

16. A processor-implemented method in an autonomous vehicle for collaboration with another autonomous vehicle, the method comprising:
detecting, by a processor in a first autonomous vehicle, abnormal driving behavior by a second autonomous vehicle caused by a faulty sensor on the second autonomous vehicle;
sending, by the processor, a collaboration request to the second autonomous vehicle responsive to detection of the abnormal driving behavior by the second autonomous vehicle;
receiving, by the processor, an acceptance of the collaboration request;
detecting, by the processor, a condition the second autonomous vehicle is unable to detect due to the faulty sensor; and
communicating, using the processor, information regarding the condition to the second autonomous vehicle.

17. The method of claim 16, wherein receiving an acceptance of the collaboration request comprises receiving an indication of the condition the second vehicle is unable to detect.

18. A processor-implemented method in an autonomous vehicle for collaboration with another autonomous vehicle, the method comprising:
detecting, by a processor in a first vehicle, a desire by a first autonomous vehicle for collaboration with a second autonomous vehicle due to a faulty or uncalibrated sensor on the first autonomous vehicle;
sending, by the processor, a collaboration request to the second autonomous vehicle;
receiving, by the processor, an acceptance of the collaboration request;
waiting for the second autonomous vehicle to detect a condition that could not be detected by the first autonomous vehicle due to the faulty or uncalibrated sensor; and
receiving, by the processor, detected information from the second autonomous vehicle that could not be detected by the first autonomous vehicle due to the faulty or uncalibrated sensor.

19. The method of claim 18, wherein sending a collaboration request comprises searching for an autonomous vehicle in the area and sending the collaboration request to the autonomous vehicle in the area located during the searching.

20. The method of claim 18, further comprising calibrating the uncalibrated sensor using the received information.

* * * * *